March 24, 1931. E. GESSNER 1,797,953
VARIABLE SPEED TRANSMITTING MECHANISM
Filed Nov. 6, 1929 2 Sheets-Sheet 1
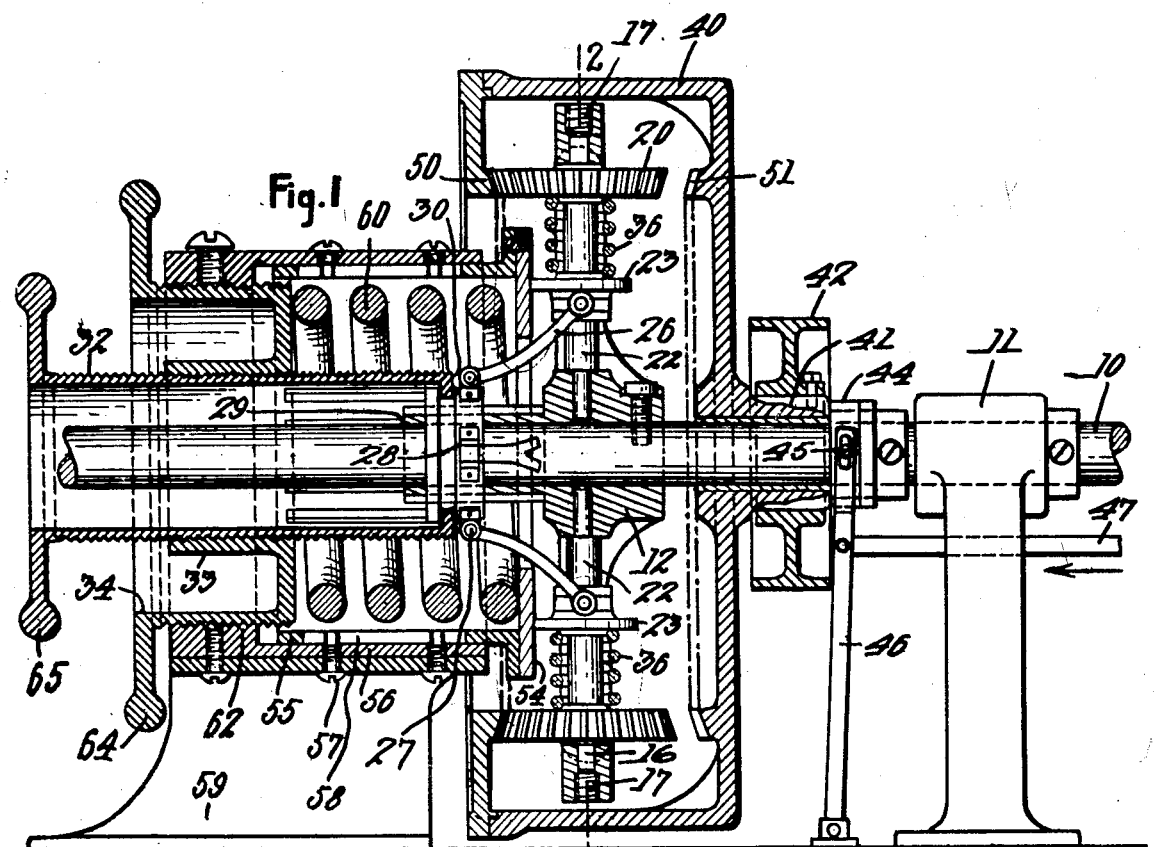
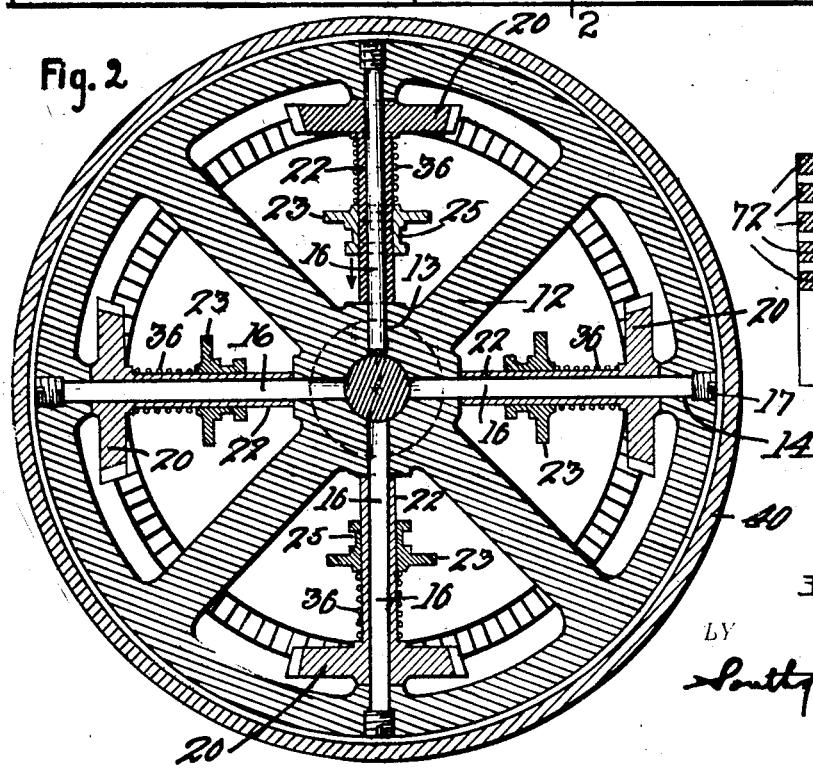
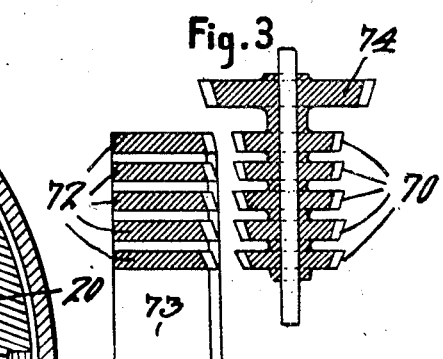
INVENTOR.
Ernest Gessner March 24, 1931. E. GESSNER 1,797,953
VARIABLE SPEED TRANSMITTING MECHANISM
Filed Nov. 6, 1929 2 Sheets-Sheet 2

INVENTOR.
Ernest Gessner
BY
Southgate Fay & Howley
ATTORNEYS

Patented Mar. 24, 1931

1,797,953

UNITED STATES PATENT OFFICE

ERNST GESSNER, OF WORCESTER, MASSACHUSETTS

VARIABLE-SPEED TRANSMITTING MECHANISM

Application filed November 6, 1929. Serial No. 405,223.

This invention relates to mechanism by which power may be transmitted at variable speeds from a driving to a driven member.

It is the general object of my invention to provide an improved construction of variable speed mechanism by the use of which the speed may be varied, neutralized and reversed by continuous axial movement of an adjusting member.

A further object is to provide means by which an additional range of speed variation may be readily attained.

I also provide means for applying power to two different members in my transmitting mechanism, the motion of the driven member being the resultant of the effects of the two driving members.

My invention further relates to arrangements and combinations of parts which will be hereinafter described and more particularly pointed out in the appended claims.

A preferred form of the invention is shown in the drawings in which

Fig. 1 is a sectional front elevation of my improved transmitting mechanism;

Fig. 2 is a sectional end elevation, taken along the line 2—2 in Fig. 1;

Fig. 3 is a detail sectional view suggesting a modification;

Figure 4:
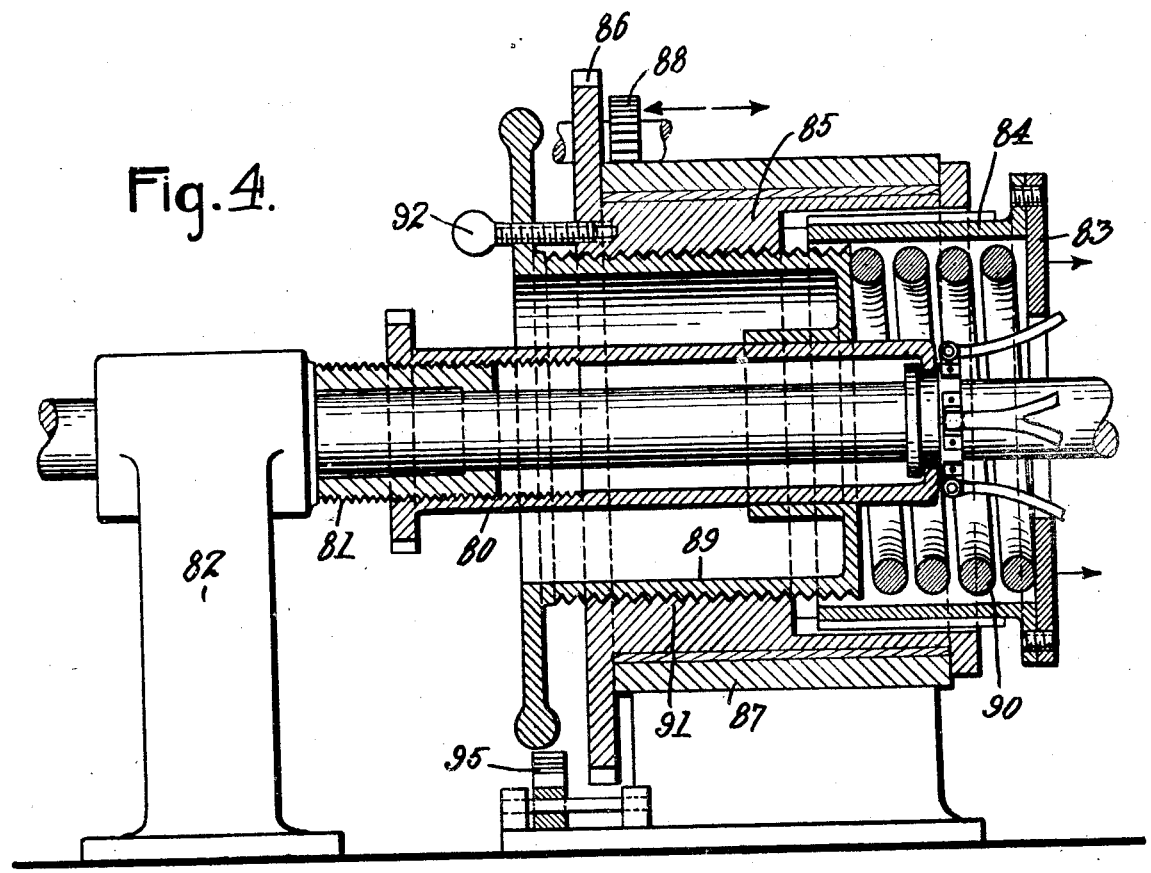
Fig. 4 is a sectional front elevation of a modified form of the structure shown in Fig. 1.

Referring particularly to Figs. 1, 2 and 4, I have indicated a variable speed transmitting mechanism comprising a driving shaft 10 rotatably mounted in suitable bearings, one of which is indicated at 11. A frame work or spider 12 is secured to the shaft 10 and is provided with sockets 13 and 14 in the hub and rim respectively, to receive radially disposed shafts 16 held from displacement by screws 17. A bevel pinion 20 is rotatably mounted on each radial shaft 16 and is provided with a long hub or sleeve 22 on which a friction disc 23 is mounted. The disc 23 is keyed or otherwise secured to the sleeve 22 in such manner that the disc 23 is freely slidable axially of the sleeve but is non-rotatable thereon.

Each disc 23 has a grooved hub 25 to receive a yoke member 26 (Fig. 1) having its opposite end pivoted at 27 to a ring or collar 28. The collar 28 is slidable but non-rotatable on a hub portion 29 of the spider 12 and is grooved to receive projections 30 at the inner end of an adjusting sleeve 32 which is threaded in the hub 33 of a second adjusting member 34 to be described. Springs 36 are mounted on the sleeves 22 of the bevel pinions 20 and yieldingly force the friction discs toward the axis of the shaft 10.

A casing 40 is rotatably mounted on the shaft 10 and is provided with a hub portion 41 on which a driven pulley 42 is secured. The casing 40 is freely rotatable on the shaft 10 and is also slidable thereon. The outer end of the hub 41 is grooved to receive a collar 44 connected by pins 45 to a yoke lever 46 which may be moved manually by means of a link 47. The casing 40 is provided with beveled ring gears 50 and 51 formed on the opposite inner side walls of the casing. By sliding the casing axially, either the gear 50 or the gear 51 may be caused to engage and mesh with the several bevel pinions 20.

A friction plate 54 is secured on the flanged inner end of a supporting sleeve 55, which is slidably mounted in a bearing 56 but is held from rotation by screws 57 extending into slots 58 in the sleeve 55. The bearing 56 is mounted on a suitable stand 59 secured to the floor or other suitable structure.

A relatively heavy coil spring 60 is disposed between the friction plate 54 at its inner end and the inner face of the adjusting member 34 at its outer end. The member 34 is threaded in an inwardly projecting ring portion 62 of the bearing member 56.

Having described the preferred form of my improved transmitting mechanism, the operation thereof is as follows:—

Assuming that power is applied to the driving shaft 10, the spider 12 will be positively rotated, carrying with it the bevel gears 20 and friction discs 23. Assuming that the casing 40 is in the right hand position indicated in Fig. 1, the pinions 20 will mesh and roll around in contact with the ring gear 50, while the discs 23 will have rolling engagement with the fixed friction plate 54.

The pressure between the friction discs and the friction plate is regulated by the hand wheel 64 connected to the adjusting sleeve 34, and the radial position of the discs 23 is determined by the hand wheel 65 connected to the sleeve 32.

If the discs 23 are in the neutral position indicated in Fig. 1, the discs 23 will roll on the friction plate 54 at such a speed that the pinions 20 will roll freely on the ring gear 50. Consequently the discs and pinions will rotate freely and no motion will be transmitted to the driven pulley 42.

If the discs 23 are moved from neutral position either outward or inward, they will roll proportionally faster or slower than the pinions 20 will roll on the gear 50. Consequently a positive movement of rotation in one direction or the other will be imparted to the ring gear 50 and casing 40 and the speed of rotation will increase as the discs 23 are moved further and further from their neutral or mid-position.

I am thus able to vary, neutralize or reverse the rotation of the driven pulley 42 by axial adjustment of the friction discs 23, which adjustment is produced by adjustment of the sleeve 32 by the hand wheel 65 and without disengagement of any part of the transmitting mechanism.

Further speed variations may be obtained by sliding the casing 40 to the left in Fig. 1, so that the bevel pinions 20 will engage the ring gear 51. When thus engaged, a different initial speed is obtained for a given setting of the discs 23 and this speed may be increased or decreased by axial adjustment of the discs, but cannot be reversed, as there is no practical neutral or negative position with this arrangement of the parts.

Under some circumstances, a positive drive without friction members may be desirable and I have indicated in Fig. 3 that this positive drive may be readily obtained by replacing the friction discs with a series of bevel pinions 70 and by replacing the friction plate 54 by a series of non-rotatable bevel gears 72 formed on axially slidable sleeves 73. The gears 72 are held from rotation and the speed of rotation of the bevel pinions 74 will depend upon which gear 72 is moved into engagement with the bevel pinions 70. The pinions 74 engage a driven ring gear as previously described.

In Fig. 4, I have indicated a construction by which additional speed variations may be obtained. The sleeve 80 by which the friction discs are adjusted is threaded on the end of a bushing 81 supported by a bearing stand 82. The friction plate 83 is mounted on the end of a sleeve or support 84 which is slidable but non-rotatable in the hub 85 of the gear 86. The hub 85 is rotatable in a suitable supporting bearing 87 and the gear 86 may be engaged by a driving pinion 88. The sleeve 89 for adjusting the spring 90 is threaded into an inwardly projecting portion 91 of the hub 85. A locking screw 92 is provided for preventing relative rotation of the sleeve 89 in the hub 85 after the spring pressure has been adjusted.

If the gear 86 and plate 83 are positively rotated in one direction or the other, it will be evident that the speed of the driven pulley 42 (Fig. 1) will be thereby increased or diminished over the speed which would have been obtained with the friction plate held stationary.

I am thus able to produce a speed of rotation in the driven member which is the resultant of the speed of the driving shaft 10 and of the driving gear 86. I have also provided a locking device 95 which may be moved into engagement with the gear 86 as the driving pinion 88 is moved out of engagement therewith. The friction plate 83 will then be held stationary and the mechanism will operate as previously described with reference to Fig. 1.

The drive may be reversed when desired, the pulley 42 being used as the driver and the shaft 10 as the driven member and this holds true in either axial position of the casing 40 and ring gears 50 and 51.

Figure 5:
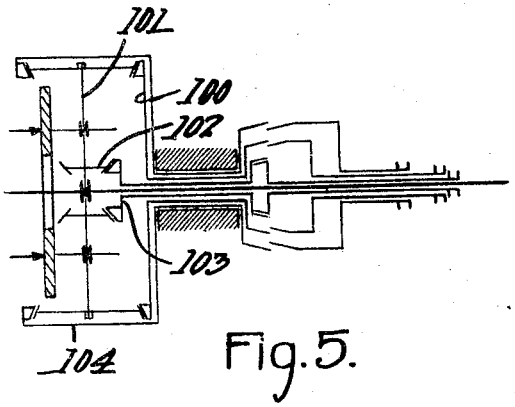
Fig. 5 is a diagrammatic view illustrating an additional combination in which my improvements may be embodied.

In Fig. 5, I have shown a diagrammatic modification in which the ring gear 100 is mounted on a separate sleeve and in which the radial shafts 101 are provided with inner pinions 102 engaging a gear 103 also on a separate transmitting sleeve. Clutches are provided for connecting the casing 104, gear 100, or gear 103 to the member to be driven. With this arrangement, all of the gears are constantly in mesh.

While I have described the pulley 42 as the driven member, my improved mechanism is in part reversible, and when the bevel pinions 20 are engaged by the ring gear 51 I can apply power to the pulley 42 and make the shaft 10 the driven member. Or the casing 40 may be held from rotation, and power applied to the shaft 10, in the form shown in Fig. 4, in which case the gear 86 becomes the driven member.

Having thus described my invention and the advantages thereof, I do not wish to be limited to the details herein disclosed, otherwise than as set forth in the claims, but what I claim is:—

1. Variable speed transmitting mechanism comprising a driving member, a driven member, and speed changing connections between said members, said connections including a spider rotatable by one of said members, a plurality of short shafts rotatably mounted in spaced radial positions in said spider, gears positively connecting said shafts to the driven member, a friction plate concentric with said driving and driven members, friction discs mounted on said radial shafts and engaging said friction plate, said friction discs being axially adjustable on but non-rotatable relative to said radial shafts, and means to positively rotate said friction plate.

2. Variable speed transmitting mechanism comprising a driving member, a driven member, and speed changing connections between said members, said connections including a spider rotatable by one of said members, a plurality of short shafts rotatably mounted in spaced radial positions in said spider, gears positively connecting said shafts to the driven member, a friction plate concentric with said driving and driven members, friction discs mounted on said radial shafts and engaging said friction plate, said friction discs being axially adjustable on but non-rotatable relative to said radial shafts, and means to shift the engagement of said second member from one side to the other of the gears on said radial shafts.

3. Variable speed transmitting mechanism comprising a driving member, a driven member, and speed changing connections between said members, said connections including a spider rotatable by one of said members, a plurality of short shafts rotatably mounted in spaced radial positions in said spider, gears positively connecting said shafts to the driven member, a friction plate concentric with said driving and driven members, friction discs mounted on said radial shafts and engaging said friction plate, said friction discs being axially adjustable on but non-rotatable relative to said radial shafts, means to yieldingly press said friction plate against said friction discs, and means to effect manual adjustment of the yielding pressure while the machine is in operation.

4. A variable speed transmitting mechanism comprising a driving member, a driven member, a supporting member positively rotated by said driving member, a friction plate held from free rotation, a plurality of spaced radially extending shafts mounted in said supporting member, friction discs slidable on said radial shafts and engaging said friction plate, means to slide said discs radially, transmitting gears fixed to the outer ends of said radial shafts, and a ring gear directly engaged by said transmitting gears and connected to said driven member.

5. The combination in a variable speed transmitting mechanism as set forth in claim 4 in which the ratio of the diameter of the transmitting gears to the diameter of the ring gear is the same as the ratio of the diameter of the friction discs to the diameter of the circle of contact thereof on said friction plate when the discs are at an intermediate position in their range of adjustment of said radial shafts, whereby said ring gear may be rotated, stopped or reversed by radial adjustment of said friction discs.

6. A variable speed transmitting mechanism comprising a driving member, a driven member, a supporting member positively rotated by said driving member, a friction plate held from free rotation, a plurality of spaced radially extending shafts mounted in said supporting member, friction discs slidable on said radial shafts and engaging said friction plate, means to slide said discs radially, transmitting gears fixed to the outer ends of said radial shafts, a casing rotatable with the driven member and enclosing said supporting member and radial shafts, and a ring gear on said casing engaged by said transmitting gears.

7. A variable speed transmitting mechanism comprising a driving member, a driven member, a supporting member positively rotated by said driving member, a friction plate held from free rotation, a plurality of spaced radially extending shafts mounted in said supporting member, friction discs slidable on said radial shafts and engaging said friction plate, means to slide said discs radially, transmitting gears fixed to the outer ends of said radial shafts, a casing rotatable with the driven member and enclosing said supporting member and radial shafts, and a ring gear on said casing engaged by said transmitting gears, said driving and driven members being reversible in function.

8. A variable speed transmitting mechanism comprising a driving member, a driven member, a supporting member positively rotated by said driving member, a friction plate held from free rotation, a plurality of spaced radially extending shafts mounted in said supporting member, friction discs slidable on said radial shafts and engaging said friction plate, means to slide said discs radially, transmitting gears fixed to the outer ends of said radial shafts, a casing rotatable with the driven member and enclosing said supporting member and radial shafts, a pair of ring gears mounted in spaced relation on said casing and each positioned to selectively engage said transmitting gears, and means to cause relative movement of said casing and supporting member, thereby effecting engagement of a selected ring gear with said transmitting gears.

9. A variable speed transmitting mechanism comprising a driving member, a driven member, a supporting member positively rotated by said driving member, a friction plate held from free rotation, a plurality of spaced radially extending shafts mounted in said supporting member, friction discs slidable on said radial shafts and engaging said friction plate, means to slide said discs radially, transmitting gears fixed to the outer ends of said radial shafts, a casing rotatable with the driven member and enclosing said supporting member and radial shafts, a pair of ring gears mounted in spaced relation on said casing and each positioned to selectively engage said transmitting gears, and means to cause relative movement of said casing and supporting member, thereby effecting engagement of a selected ring gear with said transmitting gears, said driving and driven members being reversible in function when either one of said ring gears is engaged by said transmitting gears.

In testimony whereof I have hereunto affixed my signature.

ERNST GESSNER.